United States Patent

[11] 3,580,149

[72] Inventor Shin Fujisawa
 Kanagawa, Japan
[21] Appl. No. 677,347
[22] Filed Oct. 23, 1967
[45] Patented May 25, 1971
[73] Assignee Fuji Shashin Film Kabushiki Kaisha
 Kanagawa, Japan
[32] Priority Oct. 26, 1966
[33] Japan
[31] 41/70217

[54] FILTER CORRECTION DEVICE
 4 Claims, 1 Drawing Fig.
[52] U.S. Cl.................................................. 95/11,
 356/225
[51] Int. Cl..................................................... G03b 19/00
[50] Field of Search........................................ 95/10, 11;
 352/45; 356/222, 224, 225; 350/150, 311, 315,
 317; 250/206, 208, 215, 216, 220

[56] References Cited
UNITED STATES PATENTS

| 3,208,363 | 9/1965 | Easterly | 95/11 |
| 3,246,586 | 4/1966 | Hunt | 95/11 |
| 3,421,422 | 1/1969 | Winkler | 95/11 |
| 3,452,658 | 7/1969 | Krull | 95/10 |

Primary Examiner—Samuel S. Matthews
Assistant Examiner—Russell E. Adams, Jr.
Attorney—Sughrue, Rothwell, Mion, Zinn and Macpeak ABSTRACT: A filter correction device including a pair of filters of different spectral characteristics, each filter of which is moved in and out of alignment with the optical axis of the camera lens system automatically by an electric motor responsive to closure of the normally open switch to achieve color correction in accordance with the spectral characteristics of the illuminated object to be photographed.

PATENTED MAY 25 1971
3,580,149
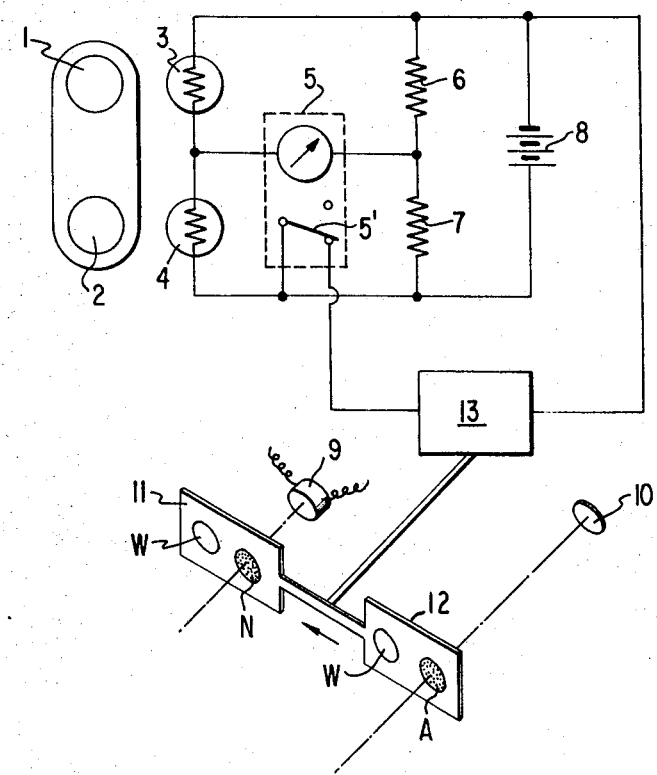
INVENTOR
SHIN FUJISAWA
BY Sughrue, Rothwell, Mion, Zinn & Macpeak
ATTORNEYS

FILTER CORRECTION DEVICE

This invention relates to a filter correction device for automatically setting a light balancing filter in an appropriate position, in operative relationship with a lens system of a camera, in response to the special characteristics of the illuminated object being photographed.

Heretofore, the spectral characteristics of the illuminated object being photographed has been corrected insofar as the camera is concerned by a light balancing filter operated by the photographer who merely observes the illuminated object with his eyes. It often happens, however, that an unskilled photographer fails to make a proper correction. This is especially true in the case where the operator uses a film of the tungsten type, since photographing is achieved where the illumination results from a daylight-type fluorescent lamp. Under such conditions, an unskilled photographer may find that the required correction is difficult or may actually forget to make the correction.

To avoid such errors completely, the present invention is intended to provide a filter correction device which automatically sets the light balancing filter in position with respect to the camera lens system, in response to the spectral characteristics of the illumination on the object being photographed. The invention will be described in detail with reference to the accompanying drawing, in which:

The single FIGURE is a partial perspective, electrical schematic view of the filter correction device of the present invention.

Referring to the drawing, a pair of light filters 1 and 2 are carried by a single support and are operatively positioned with respect to a pair of light receptors 3 and 4 in the form of photosensitive resistances which form, in conjunction with resistors 6 and 7, a conventional resistance bridge network. With respect to filters 1 and 2, one lets the light of longer wavelength pass, while the other passes light of shorter wavelength. The dotted lines 5 represent a meter and relay which are operative in responds to the relative change in the resistances of receptors 3 and 4 to indicate, by means of the meter, the change, while at the same time, closing the normally open relay switch 5'. As is conventional in bridge networks, there is provided a source of electrical power in the form of battery 8 which supplies DC to the bridge network at connection points between receptor 4 and resistance 7, and receptor 3 and resistance 6. The photoelectric element for controlling the exposure of a camera (not shown) is operatively positioned with respect to a light balancing filter assembly 11. The camera (not shown) is also provided with a lens system, including lens 10 which is shown as being operatively positioned relative to a second light balancing filter assembly 12 which is mechanically coupled to light balancing filter assembly 11. In light balancing filter assembly 11, the windows indicated at W are transparent for each assembly, while the letter N indicates an ND filter or ND filter combined with an amber-type filter, while in filter assembly 12, the portion of the assembly indicated at A comprises an amber-type filter for converting daylight into tungsten light. The light balancing filter assembly 11 corrects the incident light falling on photoelectric element 9 such that it corresponds to the sensitivity change due to color temperature conversion when the correction filter assembly 12 acts to convert the same incident light to the lens from daylight-type into tungsten-type. The filter assemblies 11 and 12 are mutually coupled mechanically to a driving device 13 which consists of an electric motor, a magnet or like electrical drive which, when energized, moves the correction filter assemblies 11 and 12 so as to bring filters N and A to overlie, respectively, the photoelectric element 9 and the lens 10, and when the motor is deenergized, automatically causes the correction filter assemblies 11 and 12 to be returned under the action of springs or the like to a position in which the transparent windows at W are optically aligned with the lens and photoelectric cells or elements of the camera.

In operation, when using a tungsten type film, the relay switch 5' moves to its open position by means of the bridge circuits with the receptors 3 and 4 being under the illumination of a tungsten-type light. Under the tungsten light, the driving device 13 is deenergized and the windows W of the light balancing filter assemblies 11 and 12 are optically aligned with the photoelectric 9 and the lens 10. When the illumination is changed to daylight, the resistances of the light receptors 3 and 4 change in response to the illumination change, causing a bridge unbalance current to flow to the meter and relay elements within the section indicated at 5, thereby causing the normally open relay switch 5' to close, connecting the electrical motor 13 across the battery 8. With the driving device or motor 13 energized, the correction filter assemblies 11 and 12 are displaced from their null position such that the amber-type light balancing filter A is now aligned with lens 10 and the ND filter N is optically aligned and overlies the photoelectric element 9.

From the foregoing description, it is evident that the device in accordance with this invention automatically provides the proper exposure under any condition of illumination without requiring any judgment by the photographer and allowing the use of a tungsten-type film.

If the amber filter A is replaced by a blue filter for light balancing and the pairs of filters 1 and 2 associated with the light receptors are reversed, they may be used as a filter correction device for daylight-type films.

While the invention has been particularly shown and described with reference to a preferred embodiment thereof, it will be understood by those skilled in the art that various changes in form and details may be made therein without departing from the spirit and scope of the invention.

I claim:

1. In a camera including a camera lens system for transferring light to a photosensitive film and a photoelectric element for controlling exposure of said film, the improvement comprising: a shiftable, light balancing combined filter assembly comprising individual filters for simultaneous optical alignment with said photosensitive element and said camera lens system when said assembly is in a first position and clear windows optically aligned therewith when said assembly is in a second position, an electrical motor for moving said filter assembly between positions, a source of electrical energy, and a relay switch for coupling said source of electrical energy to said motor means and a bridge circuit including light receptors in the form of photosensitive resistances, operatively connected to light filters having different spectral characteristics which receive illuminated light from the object being photographed whereby the shiftable combined filter assembly automatically corrects the light transmitted by the camera lens system to the photosensitive film and the light falling on said photosensitive element controls the exposure of said film, depending upon the spectral characteristics of the illuminated object.

2. The camera as claimed in claim 1, where tungsten-type film is employed and said light balancing filter assembly includes an amber-type filter for optical aligning with the camera lens system and said bridge circuit is so arranged that said relay switch contacts are closed when said object to be photographed is illuminated by daylight and wherein in response to closure of said switch contacts, said electric motor moves said shiftable light balancing filter assembly to said first position.

3. The camera as claimed in claim 1, wherein daylight-type film is employed and wherein said light balancing filter optically aligned with said camera lens system comprises a blue-type filter and said bridge circuit is such that closure of said relay switch causes said motor to shift said filter assembly to said first position when said object is illuminated by daylight.

4. The camera as claimed in claim 2, wherein said shiftable light balancing filter assembly includes an ND filter for optical alignment with said photoelectric element in response to closure of said relay switch contacts and movement of said combined filter assembly to the first position under energization of said electric motor.